Figure 2:
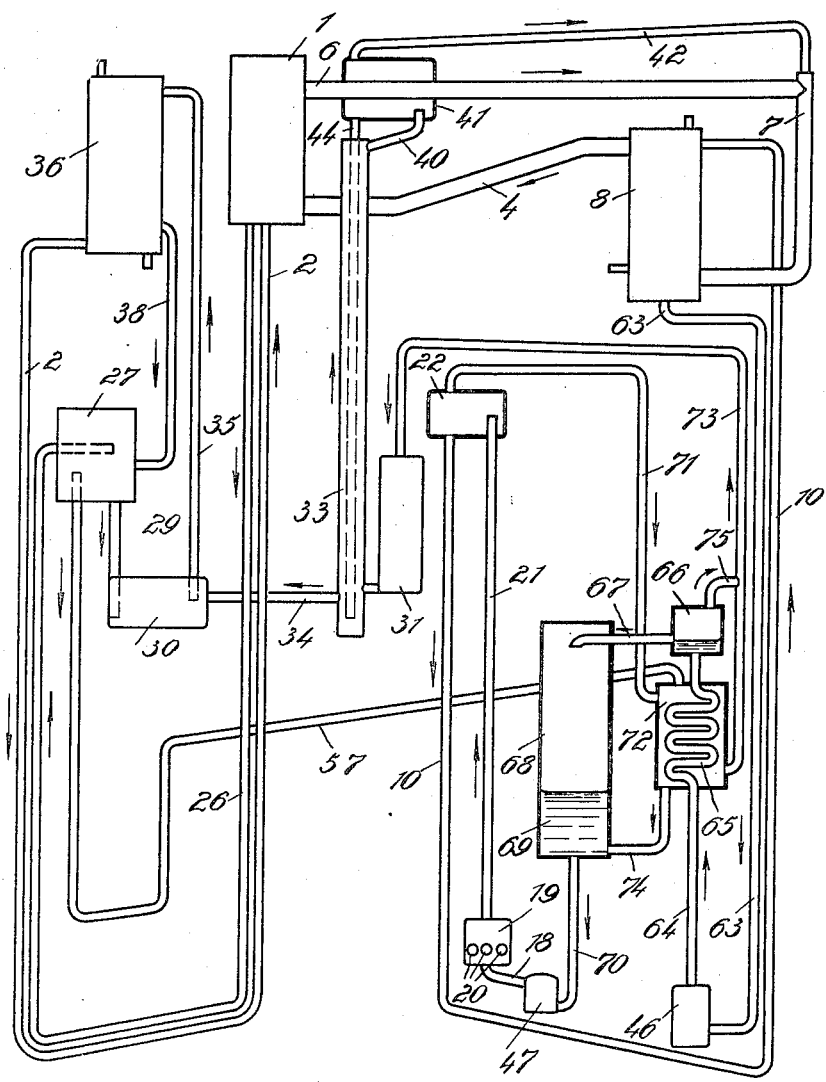

April 17, 1934. E. ALTENKIRCH 1,955,697
REFRIGERATION
Original Filed Oct. 16, 1926  2 Sheets-Sheet 1
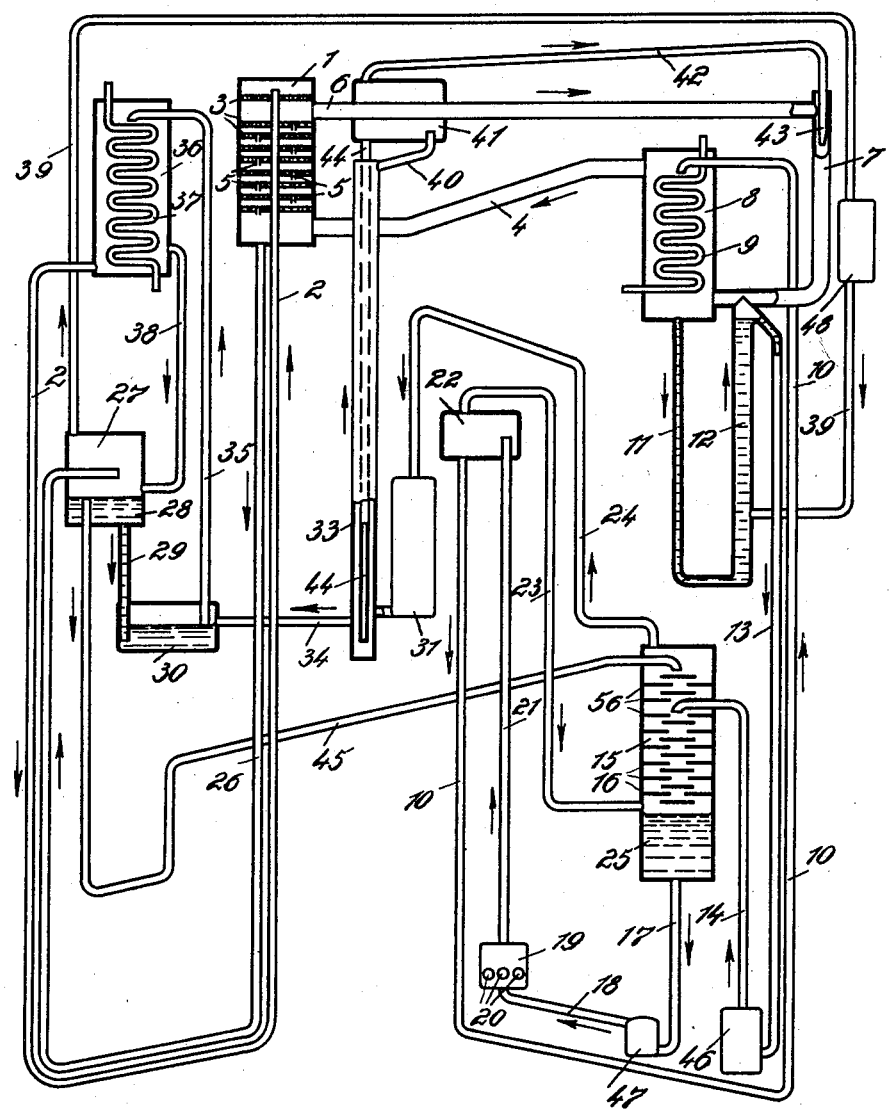
Fig. 1
Inventor
Edmund Altenkirch

Patented Apr. 17, 1934

1,955,697

UNITED STATES PATENT OFFICE 1,955,697

REFRIGERATION

Edmund Altenkirch, Alt-Landsberg Sud, Germany, assignor, by mesne assignments, to The Hoover Company, North Canton, Ohio, a corporation of Ohio Application October 16, 1926, Serial No. 141,929. Renewed March 16, 1933. In Germany October 17, 1925

29 Claims. (Cl. 62—119.5)

My invention relates to absorption refrigerating systems and more particularly to those having automatic circulation of the liquid.

Insofar as common subject matter is concerned, this application relates back to my copending application Serial No. 99,890, filed April 5, 1926 for Absorption machines.

Absorption systems are already known in which the absorption solution is kept in circulation without the aid of mechanically driven pumps and in which the absorption solution and the gas expelled from it ascend through a riser into a gas separation chamber.

According to my invention the expelled gas in such absorption systems is freed from the vapor of the solvent carried along therewith in a heat exchange or analyzer vessel which is preferably located at a lower level than the gas separating chamber.

In the drawings affixed hereto, two embodiments of my invention are illustrated diagrammatically.

Fig. 1 shows an absorption system in which water and ammonia are employed as a binary mixture and employing a direct gas and liquid contact analyzer, and Fig. 2 shows a similar system in which the expelled gas is freed from the vapor of the solvent carried along therewith by being brought in heat exchange with the absorption solution without coming in direct contact with it.

In the absorption system illustrated in Fig. 1 of the drawings, the pressure in the interior of the apparatus need not differ materially from atmospheric pressure. The cold is generated in an evaporator 1 and transmitted to the outside through its walls. Absorption solution is supplied by a pipe 2 which opens into the upper part of the evaporator. It gradually percolates through partitions 3 which consist of a suitable permeable material. Air poor in ammonia (or nitrogen or another gas) flows into the lower part of evaporator 1 from a pipe 4 and passes upward through staggered openings 5 in the partitions 3 and out from the evaporator through the pipe 6. In doing this, it comes into intimate contact with the absorption solution from which it absorbs the ammonia vapors. The air enriched with ammonia passes through pipes 6 and 7 into the lower part of the absorber 8 from which it returns to the evaporator 1 through the pipe 4. In the absorber 8 is located a cooling coil 9 over which absorption solution drips down, which solution is supplied to the absorber by the pipe 10. This solution entering the absorber 8 contains substantially less ammonia than that which passes from re-absorber 36, to be described later, through the pipe 2 into the evaporator. The ammonia in the circulating gas mixture supplied to the absorber through pipe 7 is consequently absorbed at the temperature of the cooling liquid flowing through the coil 9. The difference in concentration of the two above-mentioned solutions is the reason why, in spite of similar pressures existing in evaporator 1 and in absorber 8, and of even lower temperatures existing in evaporator 1 than in absorber 8, ammonia evaporates from the solution in evaporator 1 and is absorbed by the solution in obsorber 8. The absorption liquid enriched with ammonia flows through the two branches 11 and 12 of a U-tube and through the tubes 13 and 14 into the heat exchange or analyzer vessel 15. In this vessel, partitions or baffles 16 are provided, below the mouth of the pipe 14, over which the solution drips down until it reaches the lower part of the vessel 15 designed as a storage tank 25. From vessel 15, the solution is conducted through pipes 18 and 17 into the boiler or generator 19 which may, for instance, be heated by one or more electric heating cartridges 20. The gas expelled in member 19 by the application of heat rises, mixed with absorption solution, in an ascending pipe 21 into the gas separating chamber or fluid receiving vessel 22. There gas and absorption liquid are separated. The liquid returns through the pipe 10 into the absorber 8 while the gas is conducted into the heat exchange vessel or analyzer 15 by a pipe 23. Here the gas sweeps along partition walls 16 and 56. Partition walls 16 are irrigated by the solution coming from the absorber and the partitions 56 by a solution still richer in ammonia. The gas passes in counter-flow to these solutions and gives up a considerable part of its contents of steam or vapor of the absorption liquid, leaving the heat exchange or analyzer vessel 15 through the pipe 24. According to my invention, vessel 15 is located at a lower level than the gas separating chamber 22, so low that the absorption solution coming from the absorber 8 is able to flow into it under the pressure of the column of liquid produced, without the application of mechanically driven pumps. The low location of vessel 15 presents, furthermore, the possibility of storing up therein an amount of liquid 25 which regularly supplements the liquid ascending in the pipe 21 and thus maintains a uniform circulation of liquid.

The absorption solution dripping down in the evaporator 1 passes through the pipe 26 into an intermediate vessel 27, forms a store of liquid 28 in the lower part of this vessel and flows through the pipe 29 into the mixing vessel 30. To this mixing vessel is also supplied the gas which flows from the heat exchange or analyzer vessel 15 through the pipe 24, through the gas chamber 31, transversely through the tube 33 and finally through the connecting pipe 34. Gas and liquid ascend together in the pipe 35 and the absorption solution as well as the gas enter the upper part of the re-absorber 36. The liquid flows down within this vessel over the coil 37 through which cooling water passes, and, in so doing, the liquid absorbs the gas. The heat of absorption developed is carried off by the cooling liquid. The enriched absorption solution flows from the lower part of the re-absorber 36 through the pipe 2 into evaporator 1 where it gives off the gas again whence it passes again into the pipe 26. The gas chamber above the absorption liquid which has collected at the bottom of the re-absorber 36 is connected with the intermediate vessel 27 through a gas pipe 38.

To meet the contingency that the absorption solution led upward in the pipe 35 might not be able to absorb the entire gas quantity in the re-absorber 36, the intermediate vessel 27 is connected with the branch 12 of the U-tube by a pipe 39. This tube 12 is so dimensioned that any ascending air or gas bubbles are not able to eject the liquid. They pass into the pipe 7 in which the gas mixture of air and ammonia circulates.

At the junction point between the pipes 6 and 7 is provided a nozzle 43 through which gases from a space of higher pressure flow into a space of lower pressure. The gas on issuing from the nozzle sets the gas-air mixture in the tube 7 in motion, in the manner of a jet pump or ejector, and thus effects the gas circulation through the absorber 8 and the evaporator 1. The supply pipe 42 for the nozzle 43 derives its gas from the gas vessel 31 by way of drainage chamber 41. While the largest portion of the gas delivered from gas chamber 31 passes through the pipe 34, a comparatively small portion flows through the pipe 33 and the connecting pipe 40 into the drainage chamber 41 and hence to the nozzle 43 through the pipe 42.

The pipe 6 coming from the evaporator 1 passes through the drainage chamber 41 so that the ammonia gas passing to the nozzle 43 is still further dehydrated. The condensate drains off through the pipe 44 which extends down within the wider tube 33 and is open at the bottom. The liquid collected at the bottom of tube 44 flows through the pipe 34 into the mixing vessel 30.

In the intermediate vessel 27 is provided an overflow formed by the open end of the pipe 45. Any excess of liquid passes through this pipe into the upper part of the heat exchange vessel 15. Since this solution is still richer in gas than that coming from the absorber 8, it effects a further rectification of the ammonia gas. The more solution carried along into the re-absorber system by the expelled gas, the more returns through the pipe 45 and the more extensive is the rectification effected thereby. This particular feature forms the subject matter of my co-pending application Serial No. 309,262, filed September 29, 1928, and which constitutes as to this feature a continuation of the present application.

The vessel 46 serves as sludge collector and is also intended to prevent the solution from being ejected from the pipes 13 and 14 in case, during temporary interruption in operation, the pressure in the absorber 8 becomes higher than in the heat exchange or analyzer vessel 15. In order to prevent liquid being forced, for the same reason, from the wide tube branch 12 into the re-absorber system through the pipe 39, a vessel 48 is provided in which the gas is able to pass through the collected liquid.

For similar reasons, the gas vessel 31 provided at the end of the pipe 24 is so dimensioned that, if necessary, it is able to hold the entire quantity of liquid in the intermediate vessel 27 and in the portions of the pipes 2 and 26 located at a higher level.

A vessel 47 is provided between the tubes 17 and 18 so that, in the event of a particularly vigorous development of gas in the boiler 19, gas bubbles will not pass back into the heat exchange or analyzer vessel 15 through the pipes 18 and 17. Vessel 47 is of such dimensions that it is able to hold temporarily increased gas developments.

The expelled gas may also be freed from the vapor of the solvent carried along therewith by causing it to pass in heat exchange with the absorption solution without coming into direct contact with it. An embodiment of this part of my invention is illustrated in Fig. 2 of the drawings. In this modification of my improved ammonia absorption system, the gas and the absorption solution enter into heat exchange relation in a vessel 72 without coming in contact with each other. The absorption solution coming from the absorber 8 is conducted through a pipe 63, the vessel 46, the pipe 64 and into a coil 65. The solution passes through this coil and into a vessel 68 in the lower part of which a store of liquid 69 is formed. It then passes through the pipe 70 into the vessel 47 as in Fig. 1 and thence through the pipe 18 into the boiler or generator 19. Together with the expelled gas, it ascends in the pipe 21 into the gas separation chamber 22 Here gas and solution are separated. The solution flows through the pipe 10 into the absorber 8 while the gas is conducted through the pipe 71 into the heat exchange or analyzer vessel 72, in the interior of which is provided the previously mentioned coil 65 through which the solution passes. On the surface of the coil a large portion of the vapor of the solvent carried along by the gas condenses. The thus dried gas then passes through the pipe 73 into the vessel 31 and hence into the re-absorber system, which is identical with that illustrated in Fig. 1 of the drawings. The water of condensation precipitated in the heat exchange vessel 72 flows through the pipe 74 into the lower part of the vessel 68. The latent heat liberated during the precipitation of the water is absorbed by the solution in the pipe coil 65. Gases, which may have been expelled due to the heating, separate in the vessel 66 from the solution and are conducted into the pipe 73 through the connecting pipe 75 so that they reach the re-absorber system together with the other volumes of gas.

If the coil 65 is to function properly it must be exposed to the gases passing through the vessel 72. For this reason the body of liquid 69 in the vessel 68 should not stand at a level higher than that indicated in the drawings. Due to the location of the gas separation chamber 66, the coil 65 will accordingly always be filled with liquid while being exposed on the outside to the gases passing from the gas separation chamber 22 through the conduit 71 the vessel 72 and the conduit 73.

The U-tube 11—12, which according to Fig. 1 of the drawings is provided for the discharge of surplus gas from the re-absorber system is, for the sake of clearness not again illustrated in Fig. 2 of the drawings.

Various modifications and changes may be made without departing from the spirit and the scope of the invention.

I claim as my invention:—

1. The method of producing refrigeration by means of absorption refrigerating apparatus having a boiler, an absorber and a gas separator, said method including the steps of expelling a refrigerant from an absorption solution in the boiler, conveying both the refrigerant and the solution to the separator, separating the two in the separator, conveying the weakened solution to the absorber, causing the expelled refrigerant to produce cooling effect and then return to the absorber wherein it is absorbed by the solution liquid, conveying the enriched absorption solution back to the boiler and causing the expelled refrigerant to pass into direct and intimate contact with the enriched absorption solution entering the boiler after the expelled refrigerant has passed through the gas separating chamber to remove solution liquid entrained in the expelled refrigerant leaving the separator.

2. In an absorption machine constituting a system of free medium circulation in combination with an evaporator for liberating a gaseous working medium absorbed in a liquid, an absorber for absorbing the vaporized medium in a solution, a boiler for expelling the medium absorbed by the solution in the absorber, a re-absorber in which the expelled medium is re-absorbed, a gas separator leading to said re-absorber and being disposed above the boiler for separating the expelled gas from the liquid which contained it, conduits operatively connecting the before-mentioned units, and an ascending tube connecting the boiler with the separator and adapted to raise liquid by the ascension of gas bubbles, of a heat exchanger connected between said separator and said re-absorber for freeing the medium, expelled in the boiler, from the solvent vapor carried along, said exchanger being located at a point lower than the said gas separator.

3. In an absorption machine constituting a system of free medium circulation in combination with an evaporator for liberating a gaseous working medium absorbed in a liquid, an absorber for absorbing the vaporized medium in a solution, a boiler for expelling the medium absorbed by the solution in the absorber, a re-absorber in which the expelled medium is re-absorbed, a gas separator leading to said re-absorber and being disposed above the boiler for separating the expelled gas from the liquid which contained it, conduits operatively connecting the before-mentioned units, and an ascending tube connecting the boiler with the separator and adapted to raise liquid by the ascension of gas bubbles, of a heat exchanger connected between said separator and said re-absorber for freeing the medium, expelled in the boiler, from the solvent vapor carried along, said exchanger being located at a point lower than the said gas separator, the absorption solution being conducted from the absorber to the boiler through said exchanger in counter current with the gaseous medium passing through the exchanger.

4. In an absorption machine in combination with an evaporator for liberating a gaseous working medium absorbed in a liquid, an absorber for absorbing the vaporized medium in a solution, a boiler for expelling the medium absorbed by the solution in the absorber, a re-absorber in which the expelled medium is re-absorbed, a gas separator leading to said re-absorber and being disposed above the boiler for separating the expelled gas from the liquid which contained it, conduits operatively connecting the before-mentioned units, and an ascending tube connecting the boiler with the separator and adapted to raise liquid by the ascension of gas bubbles, of a heat exchanger connected between said separator and said re-absorber for freeing the medium, expelled in the boiler, from the solvent vapor carried along, said exchanger being located at a point lower than the said gas separator, the absorption solution being conducted from the absorber to the boiler through said exchanger in counter current and in direct contact with the gaseous medium passing through the exchanger.

5. In an absorption machine in combination with an evaporator for liberating a gaseous working medium absorbed in a liquid, an absorber for absorbing the vaporized medium in a solution, a boiler for expelling the medium absorbed by the solution in the absorber, a re-absorber in which the expelled medium is re-absorbed, a gas separator leading to said re-absorber and being disposed above the boiler for separating the expelled gas from the liquid which contained it, conduits operatively connecting the before-mentioned units, and an ascending tube connecting the boiler with the separator and adapted to raise liquid by the ascension of gas bubbles, of a heat exchanger connected between said separator and said re-absorber for freeing the medium, expelled in the boiler, from the solvent vapor carried along, said exchanger being located at a point lower than the said gas separator, the absorption solution being conducted from the absorber to the boiler through said exchanger in counter current and in direct contact with the gaseous medium passing through the exchanger, said exchanger having a liquid storage space in its lower portion.

6. In an absorption machine in combination with an evaporator for liberating a gaseous working medium absorbed in a liquid, an absorber for absorbing the vaporized medium in a solution, a boiler for expelling the medium absorbed by the solution in the absorber, a re-absorber in which the expelled medium is re-absorbed, a gas separator leading to said re-absorber and being disposed above the boiler for separating the expelled gas from the liquid which contained it, conduits operatively connecting the before-mentioned units, and an ascending tube connecting the boiler with the separator and adapted to raise liquid by the ascension of gas bubbles, of a heat exchanger connected between said separator and said re-absorber for freeing the medium, expelled in the boiler, from the solvent vapor carried along, said exchanger being located at a point lower than the said gas separator, the absorption solution being conducted from the absorber to the boiler through said exchanger in counter current with the gaseous medium passing through the exchanger, and means for conducting excess amounts of the empoverished absorption solution, discharged from the evaporator into said exchanger, to bring it into heat exchanging contact with the expelled gases passing through said exchanger.

7. In an absorption machine, comprising a system of free medium circulation, in combination with an evaporator for converting a refrigerant from a contracted fluid phase into a vaporous phase to produce cold, an absorber for absorbing the vaporous refrigerant in a solution, a boiler for expelling the refrigerant absorbed by said solution, a gas separator disposed above said boiler for separating the medium vapor expelled in the boiler from the solution which contained it, and conduits operatively connecting the aforementioned units, of a heat exchanger located at a point lower than said absorber and having connections with said absorber, said boiler, and said separator, and having means for directly and intimately contacting the medium vapor delivered by the separator with enriched solution discharged from said absorber, for rectifying the medium vapor.

8. In absorption refrigerating apparatus, an absorber for absorbing refrigerant into solution in an absorption liquid, a vessel adapted to be heated to expel refrigerant gas from solution, an upflow conduit connected to said vessel, a vessel connected to said upflow conduit above said gas expelling vessel to receive fluid therefrom, an analyzer vessel, a downflow conduit connected to said analyzer vessel and to said gas expelling vessel, said conduits and gas expelling vessel forming a thermo-siphon apparatus for lifting liquid to the fluid receiving vessel, said analyzer vessel being so disposed and connected to the downflow conduit that the top of the column of liquid on the downflow side of the thermo-siphon is within the analyzer vessel, means to conduct gas from the fluid receiving vessel into the analyzer vessel adjacent the liquid surface therein, and means to conduct liquid from the absorber to the analyzer vessel, said vessels and connections providing direct gas and liquid contact in said analyzer vessel between liquid flowing from the absorber and gas flowing from the fluid receiving vessel, and means to conduct gas from said analyzer vessel.

9. Absorption refrigerating apparatus comprising an evaporator, means for converting refrigerant gas to more dense phase, an absorber for absorbing refrigerant into solution in an absorption liquid, a vessel adapted to be heated to expel refrigerant gas from solution, an upflow conduit connected to said vessel, a vessel connected to said upflow conduit above said gas expelling vessel to receive fluid therefrom, an analyzer vessel, a downflow conduit connected to said analyzer vessel and to said gas expelling vessel, said conduits and gas expelling vessel forming a thermo-siphon apparatus for lifting liquid to the fluid receiving vessel, said analyzer vessel being so disposed and connected to the downflow conduit that the top of the column of liquid on the downflow side of the thermo-siphon is within the analyzer vessel, means to conduct gas from the fluid receiving vessel into the analyzer vessel adjacent the liquid surface therein, and means to conduct liquid from the absorber to the analyzer vessel, said vessels and connections providing direct gas and liquid contact in said analyzer vessel, means to conduct gas from said analyzer vessel to the densifying means, and conduits and vessels supplementing the aforesaid parts to form an open conduit system including means for conducting liquid from the fluid receiving vessel to the absorber and means to circulate an inert gas between the evaporator and the absorber.

10. In absorption refrigerating apparatus, an absorber for absorbing refrigerant into solution in an absorption liquid, a vessel adapted to be heated to expel refrigerant gas from solution, an upflow conduit connected to said vessel, a vessel connected to said upflow conduit above said gas expelling vessel to receive fluid therefrom, an analyzer vessel, a downflow conduit connected to said analyzer vessel and to said gas expelling vessel, said conduits and gas expelling vessel forming a thermo-siphon apparatus for lifting liquid to the fluid receiving vessel, said analyzer vessel being so disposed and connected to the downflow conduit that the top of the column of liquid on the downflow side of the thermo-siphon is within the analyzer vessel, means to conduct gas from the fluid receiving vessel into the analyzer vessel at a given level therein, and means to conduct liquid from the absorber to the analyzer vessel at a higher level therein than said given level, said vessels and connections providing direct gas and liquid contact in said analyzer vessel between liquid flowing from the absorber and gas flowing from the fluid receiving vessel, and means to conduct gas from said analyzer vessel.

11. Refrigerating apparatus comprising a generator, an absorber, means for converting gas to more dense phase, an evaporator, members connecting the aforesaid parts to form a system having circulation of refrigerant through all the aforesaid parts and a circulation circuit for inert gas between the evaporator and the absorber and a circulation circuit for absorption liquid between the generator and the absorber, said absorption circulation circuit including thermo-siphon circulation means, and said apparatus including means for conducting gas flowing from the generator toward the densifying means into direct contact with absorption liquid flowing from the absorber to the generator.

12. Refrigerating apparatus comprising a generator, an absorber, means for converting gas to more dense phase, an evaporator, members connecting the aforesaid parts to form a system having circulation of refrigerant through all the aforesaid parts and a circulation circuit for inert gas between the evaporator and the absorber and a circulation circuit for absorption liquid between the generator and the absorber, said absorption circulation circuit including thermo-siphon circulation means, and said apparatus including means for conducting gas flowing from the generator toward the densifying means into heat exchange relation with absorption liquid flowing from the absorber to the generator.

13. Refrigerating apparatus comprising a generator, an absorber, means for converting gas to more dense phase, an evaporator, members connecting the aforesaid parts to form a system having circulation of refrigerant through all the aforesaid parts and a circulating circuit for inert gas between the evaporator and the absorber and a circulation circuit for absorption liquid between the generator and the absorber, said absorption circulation circuit including thermo-siphon circulation means, and said apparatus including means for conducting gas flowing from the generator toward the densifying means into direct contact with absorption liquid flowing from the absorber to the generator at an intermediate level relative to the column of gas and liquid in the thermo-siphon means.

14. Refrigerating apparatus comprising a gas expeller, an absorber, means for converting gas to more dense phase, an evaporator, members connecting the aforesaid parts to form a system having circulation of refrigerant through all the aforesaid parts and a circulation circuit for inert gas between the evaporator and the absorber and a circulation circuit for absorption liquid between the gas expeller and the absorber, said absorption circulation circuit including said gas expeller, a separating chamber, a conduit for gas and liquid extending upwardly from said gas expeller to said separating chamber and an analyzer vessel having space for gas and liquid contact at an intermediate level of said upwardly extending conduit, and means to conduct gas downwardly from said separating chamber to the last-mentioned space.

15. In absorption refrigerating apparatus including absorbing, densifying and evaporating members and operating with refrigerant, absorption liquid and inert gas flowing in open unrestricted conduits, the improvement which consists in flowing absorption liquid from the absorber into heat exchange relation with gas flowing to the densifying member, then conducting absorption liquid downwardly to a lower level than the place of heat exchange, expelling gas from the absorption liquid at said lower level and raising the absorption liquid due to the expulsion of gas to a higher level than the place of heat exchange, conducting gas from said higher level downwardly to the place of heat exchange, and conducting liquid from said higher level to the absorbing member.

16. In absorption refrigerating apparatus including absorbing, densifying and evaporating members and operating with refrigerant, absorption liquid and inert gas flowing in open, unrestricted conduits, the improvement which consists in flowing absorption liquid from the absorber into direct gas and liquid contact with gas flowing to the densifying member, then conducting the absorption liquid downwardly to a lower level than the place of gas and liquid contact, expelling gas from the absorption liquid at said lower level and raising the absorption liquid due to the expulsion of gas to a higher level than the place of gas and liquid contact, conducting gas from the higher level downwardly to the place of gas and liquid contact, and conducting liquid from said higher level to the absorbing member.

17. An absorption refrigerating system of the continuous flow type in which inert gas is circulated between the absorber and the evaporator comprising means to generate refrigerant gas from absorption liquid at a relatively low level in the system and to lift gas and absorption liquid to a higher level in the system, a receiving vessel for separating the lifted gas and liquid, an analyzer vessel for direct gas and liquid contact at a level of the system intermediate said low level and said higher level, means to conduct liquid from said analyzer vessel to the generating means, the parts being so arranged and connected as to maintain a pool of liquid in said analyzer vessel, means to conduct liquid to said analyzer vessel, and means to conduct gas from said receiving vessel to said analyzer vessel to have direct contact with liquid therein.

18. A process of producing refrigeration comprising expelling refrigerant from solution, conveying expelled refrigerant and solution upwardly due to the expulsion of refrigerant, separating the expelled refrigerant and solution, converting the expelled refrigerant to more dense phase, causing the refrigerant to evaporate to absorb heat, absorbing evaporated refrigerant in the separated solution to produce strong solution, and causing the expelled refrigerant while on its way to evaporation to pass through the strong solution in direct contact therewith to remove solution liquid entrained in the expelled refrigerant after its separation from the solution.

19. In an absorption apparatus, the combination with an evaporator for liberating a gaseous working medium absorbed in a liquid, an absorber for absorbing the vaporized medium in a solution, a boiler for expelling the medium absorbed by the solution in the absorber, a re-absorber in which the expelled medium is re-absorbed, a gas separator connected to said re-absorber and being disposed above the boiler for separating the expelled gas from the liquid which contained it, conduits operatively connecting the before-mentioned units, and an ascending tube connecting the boiler with the separator and adapted to raise liquid by the ascension of gas bubbles, of a heat exchanger connected between said separator and said re-absorber for freeing the medium, expelled in the boiler, from the entrained solvent vapor, said exchanger being located at a point lower than the said gas separator, a wall in said heat exchange vessel for separating its interior into two parts, one side of said wall being in contact with said absorption solution on its way from the absorber to said ascending tube and the other side of said wall being in contact with the gas coming from said gas separator chamber.

20. In an absorption apparatus, the combination with an evaporator for liberating a gaseous working medium absorbed in a liquid, an absorber for absorbing the vaporized medium in a solution, a boiler for expelling the medium absorbed by the solution in the absorber, a re-absorber in which the expelled medium is re-absorbed, a gas separator connected to said re-absorber and being disposed above the boiler for separating the expelled gas from the liquid which contained it, conduits operatively connecting the before-mentioned units and an ascending tube connecting the boiler with the separator and adapted to raise liquid by the ascension of gas bubbles, of a heat exchanger connected between said separator and said re-absorber for freeing the medium expelled in the boiler from the entrained solvent vapor, said exchanger being located at a point lower than the said gas separator, a wall in said heat exchange vessel for separating its interior into two parts, one side of said wall being in contact with said absorption solution on its way from the absorber to said ascending tube and the other side of said wall being in contact with the gas coming from said gas separation chamber, said wall being formed by a pipe traversing said heat exchange vessel and conducting said absorption solution, the outside of said pipe being swept by said gas.

21. In an absorption apparatus, the combination with an evaporator for liberating a gaseous working medium absorbed in a liquid, an absorber for absorbing the vaporized medium in a solution, a boiler for expelling the medium absorbed by the solution in the absorber, a re-absorber in which the expelled medium is re-absorbed, a gas separator connected to said re-absorber and being disposed above the boiler for separating the expelled gas from the liquid which contained it, conduits operatively connecting the before-mentioned units and an ascending tube connecting the boiler with the separator and adapted to raise liquid by the ascension of gas bubbles, of a heat exchanger connected between said separator and said re-absorber for freeing the medium expelled in the boiler from entrained solvent vapor, said exchanger being located at a point lower than the said gas separator, a wall in said heat exchange vessel for separating its interior into two parts, one side of said wall being in contact with said absorption solution on its way from the absorber to said ascending tube and the other side of said wall being in contact with the gas coming from said gas separation chamber, said wall being formed by a pipe traversing said heat exchange vessel and conducting said absorption solution, the outside of said pipe being swept by said gas, and a gas discharge pipe connected with said heat exchange pipe for discharging any gases, expelled in said last named pipe, into said re-absorber.

22. In continuous absorption refrigerating apparatus permitting free circulation of the operating media, the combination with a boiler, a gas separator, an absorber and conduits connecting the same, of an analyzer, open conduits for connecting the analyzer to said absorber and said boiler for conveying a strong absorption solution from said absorber to said boiler through said analyzer by gravity flow and a conduit for conveying a mixture of refrigerant and solvent vapor from said separator to said analyzer whereby the absorption solution passing through said analyzer may function to remove a portion of the solvent from said refrigerant vapor supplied from the separator, said analyzer being constructed to prevent direct contact between said refrigerant vapor and said absorption solution and for causing the exchange of heat between the two.

23. Continuous absorption refrigerating apparatus permitting free circulation of the operating media and having, in combination, a boiler, an absorber, a heat exchanger located below said absorber, open conduit means for conveying weak absorption solution from said boiler to said absorber, open conduit means for conveying strong absorption solution from said absorber to said heat exchanger by gravity flow, means for conveying absorption solution from said heat exchanger to said boiler and means for causing refrigerant vapor expelled from the solution in the boiler to pass through said heat exchanger to be cooled by the absorption solution therein, said heat exchanger being constructed to prevent direct engagement between the refrigerant vapor and the absorption solution therein while providing for the quick transfer of heat between the two.

24. The method of producing continuous refrigeration by means of absorption refrigerating apparatus permitting free circulation of the operating media and having a boiler, an absorber and a gas separator, said method including the steps of expelling a refrigerant from an absorption solution in the boiler, conveying both the refrigerant and the solution to the separator, separating the two in the separator, conveying the weakened solution to the absorber, causing the expelled refrigerant to produce cooling effect and then return to the absorber wherein it is absorbed by the solution, conveying the enriched absorption solution back to the boiler by gravity flow and causing the expelled refrigerant to pass into heat exchange relation with the enriched absorption solution entering the boiler after the expelled refrigerant has passed through the gas separating chamber, while preventing direct and intimate contact between the expelled refrigerant and the enriched absorption solution during the exchange of heat.

25. The method of producing continuous refrigeration by means of absorption refrigerating apparatus permitting free circulation of the operating media and having a boiler and an absorber in open communication with each other, said method including the steps of expelling a refrigerant from an absorption solution in the boiler, causing the expelled refrigerant to produce cooling effects, returning the expelled refrigerant into the presence of the absorption solution in the absorber whereby it is again absorbed, returning the enriched solution to the boiler by action of gravity, conveying the weakened solution from the boiler back to the absorber and causing the refrigerant expelled from the solution in the boiler to give up heat to the enriched solution entering the boiler to thereby increase the efficiency of operation while preventing direct and intimate contact between the expelled refrigerant and the enriched solution during the exchange of heat between the two.

26. In absorption refrigerating apparatus permitting free circulation of the operating media, the combination with a boiler, a gas separator, an absorber and conduits connecting the same, of an analyzer, conduits for connecting the analyzer to said absorber and said boiler for conveying a strong absorption solution from said absorber to said boiler through said analyzer and a conduit for conveying a mixture of refrigerant and solvent vapor from said separator to said analyzer, whereby the absorption solution passing through said analyzer may function to remove a portion of the solvent from said refrigerant vapor supplied from the separator, said analyzer being constructed to prevent direct contact between said refrigerant vapor and said absorption solution and to cause exchange of heat between the two, the path of the strong solution from the absorber to the boiler having substantially the shape of a W, whose central portion contains in its ascending branch the heat exchange means of the analyzer, and has its descending branch connected with said analyzer to permit the discharge of solution vapor condensate from the analyzer into said descending branch.

27. Absorption refrigerating apparatus permitting free circulation of the operating media and having, in combination, a boiler, an absorber, a heat exchanger located below said absorber, means for conveying weak absorption solution from said boiler to said absorber, means for conveying strong absorption solution from said absorber to said heat exchanger by gravity flow, means for conveying absorption solution from said heat exchanger to said boiler and means for causing refrigerant vapor expelled from the solution in the boiler to pass through said heat exchanger to be cooled by the absorption solution therein, said heat exchanger being constructed to prevent direct engagement between the refrigerant vapor and the absorption solution therein while providing for the quick transfer of heat between the two, the path of the strong solution from the absorber to the boiler having substantially the shape of a W, whose central portion contains in its ascending branch the heat exchange means of said exchanger, and has its descending branch connected with said exchanger to permit the discharge of the condensate of the solution vapor, contained in the expelled refrigerant vapor, from the exchanger into said descending branch.

28. The method of producing refrigeration by means of absorption refrigerating apparatus permitting free circulation of the operating media and having a boiler, an absorber, and a gas separator, said method including the steps of expelling a refrigerant from an absorption solution in the boiler, conveying both the refrigerant and the solution to the separator, separating the two in the separator, conveying the weakened solution to the absorber, causing the expelled refrigerant to produce cooling effect and then return to the absorber wherein it is absorbed by the solution, conveying the enriched absorption solution back to the boiler in a W-shaped path, and causing the expelled refrigerant to pass into heat exchange relation with the enriched absorption solution in the ascending central portion of the W-path after the expelled refrigerant has passed through the gas separating chamber, while preventing direct and intimate contact between the expelled refrigerant and the enriched absorption solution during the exchange of heat, and discharging the condensed solution vapor produced by said heat exchange into the descending central portion of the W-path.

29. The method of producing refrigeration by means of absorption refrigerating apparatus permitting free circulation of the operating media and having a boiler and an absorber, said method including the steps of expelling a refrigerant from an absorption solution in the boiler, causing the expelled refrigerant to produce cooling effect, returning the expelled refrigerant into the presence of the absorption solution in the absorber whereby it is again absorbed, returning the enriched solution to the boiler by the action of gravity in a W-shaped path, conveying the weakened solution from the boiler back to the absorber and causing the refrigerant expelled from the solution in the boiler to give up heat to the enriched solution in the ascending central portion of the W-path, to thereby increase the efficiency of operation while preventing direct and intimate contact between the expelled refrigerant and the enriched solution during the exchange of heat between the two, and discharging the condensed solution vapor produced by said heat exchange into the descending central portion of the W-path.

EDMUND ALTENKIRCH.